Patented June 2, 1953

2,640,818

UNITED STATES PATENT OFFICE 2,640,818

THIENYL-SUBSTITUTED POLYSILOXANES

Philip A. Di Giorgio, Schenectady, N. Y., now by change of name Philip D. George, assignor to General Electric Company, a corporation of New York No Drawing. Application June 25, 1949, Serial No. 101,485

4 Claims. (Cl. 260—46.5)

This invention is concerned with thienyl-substituted organopolysiloxanes. More particularly, the invention relates to compositions of matter comprising organopolysiloxanes in which at least one of the silicon atoms in the siloxane linkage contains a thienyl radical, e. g., a 2-thienyl or a 3-thienyl radical, the general formula for which may be written as

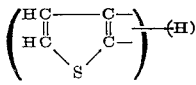

attached thereto by a C-Si bond. The scope of this invention includes polysiloxanes containing either 2-thienyl-substituted or 3-thienyl-substituted groupings, or mixtures, comprising 2-thienyl and 3-thienyl polysiloxanes.

My invention includes polysiloxanes in which essentially all the silicon atoms in the polysiloxane linkage have attached thereto only thienyl radicals by a C-Si bond, as well as polysiloxanes containing both a thienyl radical and another organic radical, for example, an organic hydrocarbon radical, attached to the same silicon atom by a C-Si linkage, and also includes polysiloxanes containing silicon atoms containing both organic groups and thienyl radicals wherein the silicon atom containing a thienyl radical is free of any other organic substituent.

Any suitable method may be used in preparing the new polysiloxanes of this invention, the choice of the method being determined largely by the yield obtained. For example, these new chemical compounds may be prepared by hydrolyzing a mass containing a compound having the formula

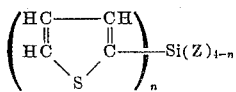

where Z is a hydrolyzable radical, e. g., a halogen (e. g., chlorine, bromine, etc.), an alkoxy radical (such as ethoxy, propoxy, butoxy, etc., radical), etc., and $n$ is an integer equal to from 1 to 3. Such hydrolyzable materials are more particularly disclosed and claimed in my copending application Serial No. 101,483, filed concurrently herewith and assigned to the same assignee as the present invention.

Another type of hydrolyzable material which may be employed in making compositions of matter coming within the scope of my claimed invention are hydrolyzable silanes corresponding to the general formula

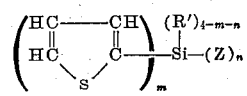

where Z is a silicon-bonded hydrolyzable member having the meaning given above, R' is a monovalent hydrocarbon radical, and $m$ and $n$ are each integers equal to from 1 to 2, inclusive, the sum of $m$ and $n$ being at most 3. Compounds corresponding to this general formula are disclosed and claimed in my copending application Serial No. 101,484, filed concurrently herewith and also assigned to the same assignee as the instant invention. Preferably, Z in the foregoing two formulas is a halogen, more particularly, chlorine.

In the usual procedure, hydrolysis of the hydrolyzable compounds is effected in either water alone or water in combination with various solvents such as ether, or in solvents of the type disclosed and used in accordance with the method described in Sauer Patent 2,398,672, issued April 16, 1946, to the same assignee. The hydrolyzed product is dehydrated to form the corresponding polysiloxane at normal (i. e., room) temperature or more rapidly at elevated temperatures, or under atmospheric or subatmospheric pressures.

In order that those skilled in the art may better understand how the present invention may be carried into effect, the following illustrative, but not limiting, examples thereof are given. All parts are by weight.

EXAMPLE 1

About 141 parts of 2-thienyltrichlorosilane were added to a mixture of water and ethyl ether in which the water was in excess of that required to effect hydrolysis of the 2-thienyltrichlorosilane. The ether layer was separated from the water and heated gently to remove the ether. This left a nearly water-white, hard, brittle thienylpolysiloxane resin. The amount of resin obtained was of the order of about 86 parts of resin which is almost a quantitative yield. This resin could be heated to near red heat without ignition and before decomposition thereof became rapid.

A sample of this resin was brushed on bright copper metal strips which were placed in an oven for 60 hours to determine whether reaction would occur between the sulfur in the resin and the copper to form black copper sulfide. Even when the samples were baked at 150° C. for the 60 hour period, the copper underneath the resin was bright and the resin remained clear. Only the sample baked at 200° C. for 60 hours showed a slight staining of the copper and a very slight darkening of the color of the resin. From these tests it was evident that the sulfur in the thienylpolysiloxane was stable.

EXAMPLE 2

Di-(2-thienyl)-dichlorosilane (41 parts) dissolved in about 36 parts ether was added with stirring over a period of 20 minutes to a mixture of 33 parts NaHCO₃, 100 parts distilled water and 214 parts ethyl ether at 5° C. The ether layer was separated, combined with two 36 part ethyl ether washes of the aqueous layer, and dried over anhydrous K₂CO₃ for several hours. Removal of the drying agent and gradual evaporation of the ether with periodic filtrations gave 12 parts of a viscous oil and 20 parts of white crystals. Heating of the oil at temperatures of from 200 to 250° C. for several hours gave a thermoplastic, clear, slightly brittle, odorless resin.

Recrystallization of 20 grams of the white crystalline material from 500 ml. of a mixture of benzene and heptane gave, after treatment with activated carbon, 18 grams of small, bright, white crystals melting at about 320° C. Purification by recrystallization of this material gave a mass of fine white crystals melting at 327–8° C. Analysis of these crystals showed them to have the following per cents of the stipulated elements.

|          | Calculated | Found |
|----------|------------|-------|
| Carbon   | 45.7       | 46.5  |
| Hydrogen | 2.9        | 3.1   |
| Sulfur   | 30.4       | 30.9  |

From the foregoing analytical results it was apparent that these crystals comprised a polymeric di-(2-thienyl)siloxane having the recurring structural unit

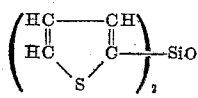

EXAMPLE 3

In this example 20 parts of tri-(2-thienyl)-chlorosilane dissolved in 10 parts toluene were added slowly to a stirred and cooled mixture comprising 20 parts t-amyl alcohol, 10 parts toluene and 95 parts water. Separation of the organic layer followed by evaporation of the solvent from this layer in vacuo gave a liquid, oily material which was soluble in benzene and in methyl ethyl ketone, and insoluble in hexane and in 95 per cent ethanol. This material comprised hexa-(2-thienyl)disiloxane.

EXAMPLE 4

A solution of 38 parts methyl 2-thienyldichlorosilane

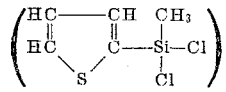

in 71.4 parts of ethyl ether was added dropwise with stirring to a cold slurry of 43 parts sodium carbonate, 18 parts water and 71.4 parts ethyl ether. The resulting isolated ether layer was dried over anhydrous K₂CO₃ and filtered. The ether was then evaporated, and the residue heated under vacuum at 150° C. for several hours to give about 12 parts of methyl 2-thienylpolysiloxane which was an oily liquid material. Analysis of this latter composition showed it to contain 21.9 per cent sulfur as compared to the theoretical value of 22.5 per cent sulfur. This oil showed good lubricity as compared to ordinary methylpolysiloxane lubricating oils as evidenced by the fact that when tested in a Shell four ball wear tester it gave only a 0.48 mm. wear scar for steel against brass under a 10 kg. load as compared to 2.3 mm. under the same condition for a straight methylpolysiloxane oil.

Hydrolysis of methyl 2-thienyldichlorosilane in aqueous sodium bicarbonate and subsequent heating of the hydrolyzed material gave a rubbery gum. When 1 part, by weight, of this gum was mixed with 2 parts TiO₂ and 0.02 part benzoyl peroxide, and the resulting mass heated in a closed mold at 150° C. for 10 minutes, there resulted a white flexible rubber having good heat resistance.

EXAMPLE 5

In this example 88 parts dimethyl 2-thienylchlorosilane dissolved in 71.4 parts ethyl ether were added with stirring over a period of 15 minutes to a mixture of 27 parts distilled water and 71.4 parts ethyl ether at 5° C. The ether layer was separated, washed directly with water until the washings were free of halide. After filtration, the ether solution was distilled through a Vigreaux column to yield 42 parts, 56 per cent yield, tetramethyl di-(2-thienyl)-disiloxane boiling at 117–121° C. at 1 mm. Analysis of this product showed it to contain 20.5 per cent sulfur as compared to the theoretical value of 21.5 per cent.

EXAMPLE 6

A solution comprising 10 parts methyl di-(2-thienyl)-chlorosilane in 17.8 parts ethyl ether was added over a period of 10 minutes to a mixture of 5 parts sodium bicarbonate, 50 parts water and 35.6 parts ethyl ether at 0–5° C. The ether layer was removed, washed and dried over anhydrous K₂CO₃. Removal of the ether by evaporation gave a liquid product which when redissolved in ether and decolorized with activated carbon yielded 7.6 parts of a colorless oil, dimethyl tetra-(2-thienyl)-disiloxane, which when heated at 200° C. for 4 hours proved to be stable.

EXAMPLE 7

In this example individual thienylchlorosilanes, specifically 2-thienyltrichlorosilane and di-(2-thienyl)-dichlorosilane, as well as mixtures of these two chlorosilanes in varying proportions were hydrolyzed to form resinous thienyl-substituted polysiloxanes. In each case the procedure was essentially as follows. A solution of the thienylchlorosilane or mixtures of the thienylchlorosilanes in 100 ml. of ether was poured into about 100 ml. of cracked ice with stirring. The aqueous layer was separated and discarded and the ether layer was washed free of chloride ion with eight 10 ml. portions of water. The ether was then evaporated and the partially condensed resin was cured by heating in air for from 1 to 3 hours. At the end of this time all the products were porous, brown, brittle solids. The following Table 1 shows the proportions of 2-thienyl-chlorosilanes used in preparing the resinous products.

Table 1

| Resin No. | 2-thienyltrichloro-silane (2-$C_4H_3S$)$SiCl_3$ | | Di-(2-thienyl) di-chlorosilane (2-$C_4H_3S$)$_2SiCl_2$ | |
|---|---|---|---|---|
| | Wt. in grams | Mol percent | Wt. in grams | Mol percent |
| A | 18.4 | 100 | 0.00 | 0 |
| B | 12.0 | 75 | 4.90 | 25 |
| C | 7.24 | 50 | 8.85 | 50 |
| D | 3.20 | 25 | 12.00 | 75 |
| E | 0.00 | 0 | 14.00 | 100 |

EXAMPLE 8

In this example 2-thienyltrichlorosilane was cohydrolyzed with either dimethyldichlorosilane, or with the latter and methyltrichlorosilane. The procedure employed in this case was identical with that used in the preceding Example 7 with the exception that the cure at 150° C. was for 15 hours. The following Table 2 shows the proportions of ingredients employed in making the above-described 2-thienyl polysiloxanes together with a description of the resulting products after the two-hour cure.

Table 2

| Resin No. | $CH_3SiCl_3$ | | $(CH_3)_2SiCl_2$ | | 2-thienyltrichlorosi-lane (2-$C_4H_3S$)$SiCl_3$ | |
|---|---|---|---|---|---|---|
| | Wt. in grams | Mol percent | Wt. in grams | Mol percent | Wt. in grams | Mol percent |
| F | 8.90 | 50 | 4.62 | 30 | 5.18 | 20 |
| G | 6.22 | 30 | 5.38 | 30 | 12.10 | 40 |
| H | 0.00 | 0 | 7.68 | 50 | 12.95 | 50 |

Remarks concerning the above resins:
F, slightly tan, very tough resin.
G, slightly tan, tough resin.
H, slightly tan, tacky resinous material.

EXAMPLE 9

In this example a mixture consisting of 13.8 grams (0.0922 mol) methyltrichlorosilane and 7.82 grams (0.0397 mol) methyl 2-thienyldichlorosilane were cohydrolyzed using the same procedure as outlined in Example 7 above. The isolated resinous product was thereafter heat-cured for 3 hours at 150° C. to yield a hard, tough, clear brown resin.

EXAMPLE 10

A mixture consisting of 5.08 grams (0.034 mol) methyltrichlorosilane, 6.72 grams (0.0341 mol) methyl 2-thienyldichlorosilane and 9.88 grams (0.0455 mol) 2-thienyltrichlorosilane was hydrolyzed in the same manner as described in Example 7 (supra). The isolated resinous product was heat treated for 3 hours at 150° C. to yield a hard, tough, clear brown resin which was slightly more brittle than the resin obtained in Example 9.

EXAMPLE 11

In this example 17.4 grams of 2-thienyltriethoxysilane were heated at reflux temperature for 5 hours in 50 ml. of 95 per cent ethanol to which had been added 5 ml. of distilled water. At the end of this time the alcohol was removed by evaporation to leave a liquid material which upon heating for 4 hours at 150° C. gave a viscous, clear, tan, oily product. Analysis of this latter composition showed it to contain about 20.5 per cent sulfur (calculated 23.7 per cent sulfur).

When 14.8 grams of 2-thienyltriethoxysilane were heated for 2 hours in 50 ml. of 95 per cent ethanol to which had been added 2 ml. of concentrated hydrochloric acid and 3 ml. of distilled water, there resulted, as a result of this acid hydrolysis, an oily product. Evaporation of the alcohol and heating of the residue at 150° C. for 3 hours gave 7.1 grams of a brittle solid resin.

Instead of using an acid hydrolysis, an alkaline hydrolysis of 2-thienyltriethoxysilane was carried out by heating under reflux conditions 17 grams of the latter material for 2 hours in 50 ml. of 95 per cent ethanol to which had been added 2 ml. of concentrated ammonium hydroxide and 3 ml. of distilled water. A taffy-like material precipitated during this time was found to be readily soluble in benzene. Evaporation of the solvents from the ammoniacal solution by heating at 60° C. for 3 hours gave 6.51 grams of a tan resin, part of which was brittle and part of which was taffy-like. Milling the mixture gave a homogeneous tan, taffy-like, non-sticky resin. Analysis of this resin showed it to contain 21.6 per cent sulfur (calculated 23.7 per cent sulfur).

It will be apparent to those skilled in the art that other hydrolyzable thienyl-substituted silanes, many of which are more particularly described and claimed in my aforementioned two co-pending applications Serial Nos. 101,483 and 101,484 may also be employed in making the claimed thienyl-substituted polysiloxanes without departing from the scope of the claimed invention. Thus, my invention embraces thienyl-substituted polysiloxanes obtained, for example, by the hydrolysis of hydrolyzable silanes containing only the thienyl radical attached to the silicon atom by C-Si linkages, as well as hydrolyzable silanes containing both a thienyl radical and an organic radical attached to the same silicon atom by C-Si linkages, many examples of which have been given in my forgoing two copending applications.

In addition, it will be obvious that these various hydrolyzable thienyl-substituted silanes mentioned previously may also be cohydrolyzed together in the form of mixtures thereof, or such individual hydrolyzable silanes or mixtures of such hydrolyzable silanes can be cohydrolyzed with other hydrolyzable organosilanes as, for instance, compounds corresponding to the general formula $(R'')_mSi(Z)_{4-m}$ where $R''$ is a monovalent hydrocarbon similar to $R'$ described previously, Z has the meaning given above, and $m$ is an integer not greater than 3. In such a case, the polysiloxanes thus obtained will contain silicon atoms, alternate or otherwise, in which one silicon atom will have a thienyl group substituted thereon and another silicon atom will be free of thienyl substitution, but instead will have only an organic group, for instance, a hydrocarbon radical substituted thereon by a C-Si linkage.

In the thienyl-substituted polysiloxanes of this invention, the thienyl radicals may be attached to any or all of the silicon atoms in the molecule, or one thienyl group may be attached to a silicon atom containing, in addition, at least one organic radical, for instance, a hydrocarbon radical attached to the same silicon radical.

Although, as shown previously, the ratio of thienyl radicals to silicon atoms may be varied within wide limits up to and including 3, I prefer that the said ratio be from about 0.5 to 2.5, preferably from 1.0 to 1.8, thienyl radicals per silicon atom. Where it is desired to prepare chain-stoppered thienylpolysiloxanes similar to the chain-stoppered organopolysiloxanes disclosed and claimed in Patnode Patents 2,469,888 and 2,469,890, issued May 10, 1949, to the same assignee as the present invention, the ratio of thienyl groups to silicon atoms will be around 1.9 to 2.0 exclusive of the chain-stoppered radicals containing silicon-bonded hydrocarbon radicals, for example, where the chain-terminating groups are trimethylsilyl groups. This, of course, assumes that all the silicon atoms intermediate the terminal silicon atoms contain only thienyl radicals attached thereto.

Obviously, as described previously, in addition to all the silicon radicals containing only thienyl radicals, it is possible in accordance with the description of my invention to obtain polysiloxanes containing both a thienyl radical and another organic radical, for instance, a hydrocarbon radical, attached to the same silicon atom, or also to have a polysiloxane chain in which some of the silicon atoms in the chain are free of thienyl substitution but instead are substituted by other organic radicals as, for example, hydrocarbon radicals (e. g., methyl, ethyl, propyl, phenyl, diphenyl, benzyl, tolyl, xylyl, cyclohexyl, cyclohexenyl, vinyl, allyl, etc. radicals).

Where the ratio of total organic groups to silicon atoms, including the thienyl radicals, is substantially less than 2, polysiloxanes of this type can usually be converted by heat to the insoluble and infusible state by virtue of the presence therein of trifunctional units such as, for example,

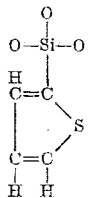

which can be incorporated in such resins, for instance, by employing a hydrolyzable thienyl-substituted silane corresponding to the general formula

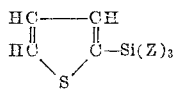

where Z has the meaning given previously. It will, of course, be apparent that trifunctional groups such as R—SI—(Z)$_3$ where R is, for instance, a monovalent hydrocarbon radical and Z has the meaning given above may also be used to impart increased functionality to thienyl-substituted polysiloxanes by virtue of the fact that such hydrocarbon-substituted trihydrolyzable silanes are cohydrolyzed with hydrolyzable thienyl-substituted silanes.

Liquid polysiloxanes containing from 1.98 to 2.00 total organic groups (including the thienyl group) per silicon atom are quite heat stable and have utility as hydraulic fluids, lubricants, etc. Greater heat stability can be imparted to such polymeric materials by intercondensing organosiloxanes containing halogen substituents on the organic groups as, for instance, the fluorinated compositions described in Rochow application Serial No. 13,087, filed March 4, 1948, and assigned to the same assignee as the present invention.

It is also intended within the scope of this invention that there may be present in the thienyl-substituted polysiloxane other copolymerized (substituted or unsubstituted, e. g., halogenated) hydrocarbon-substituted siloxanes as mentioned previously, examples of which are, for instance, copolymerized alkylsiloxanes (e. g., methyl, ethyl, propyl, isobutyl, hexyl, decyl, etc. siloxanes); copolymerized arylsiloxanes (e. g., phenyl, diphenyl, naphthyl, etc. siloxanes); copolymerized aralkylsiloxanes (e. g., benzyl, phenylethyl, etc. siloxanes); copolymerized alkarylsiloxanes (e. g., tolyl, xylyl, ethylphenyl, etc. siloxanes) etc.

In preparing thienyl-substituted polysiloxanes in which there is present on the silicon atoms of the polysiloxane chain no organic groups other than the thienyl radical, I have found it advantageous, especially in the making of resinous products, to use a hydrolyzable mixture containing from 10 to 70 mol per cent di-(2-thienyl)-dichlorosilane and from 30 to 90 mol per cent 2-thienyltrichlorosilane. This mixture upon hydrolysis yields a polysiloxane comprising polymeric di-(2-thienyl) siloxane copolymerized with 2-thienylsiloxane in the molar proportions corresponding essentially to the molar proportion of each of the starting chlorosilanes. The addition or substitution of other monofunctional, difunctional or trifunctional siloxanes may be made to modify the properties of the above-described thienyl-substituted polysiloxanes.

By varying the ratio of thienyl radicals per silicon atom and by modifying the thienyl-substituted polysiloxanes with other hydrocarbon-substituted siloxanes, it is possible to obtain condensation products having a variety of physical characteristics depending largely upon the structure and extent of polymerization and the nature of the organic groups attached to the silicon atoms. It is thus obvious that the number of thienyl groups per silicon atom may be varied within wide limits without departing from the scope of the invention.

The claimed compositions of matter may be employed for many applications. They may be used as liquid coating compositions either per se or in the form of varnishes or solutions which can be used to impregnate and coat various fibrous materials which in turn can be used for wrappings around electrical conductors for insulating the said conductors. These compositions of matter may also be employed to impregnate and coat various organic and inorganic fibrous sheets, such as asbestos, glass, cotton or paper which can be superimposed and thereafter bonded under heat and pressure to yield laminated products having eminent utility. If desired, filling materials, such as asbestos, glass fibers, talc, quartz powder, wood flour, etc.

may be incorporated into such compositions and molded under heat and pressure in accordance with practices well known in the plastics arts to make useful objects.

The individual copolymerized or mixed derivatives of this invention may be suitably incorporated into other materials to modify the properties of the latter. For example, they may be compounded with substances, such as natural and synthetic rubbers; tars, asphalts and pitches; natural resins such as rosin, shellac, etc.; synthetic resins, such as phenol-aldehyde resins, urea-aldehyde resins, modified and unmodified alkyd resins, vinyl resins, acrylic acid ester resins, etc.; cellulosic materials, for example, cellulose acetate, cellulose ethers, etc., as well as with other organic plastic compositions. The claimed polymers may also be employed as plasticizers for other organopolysiloxane resins which are normally brittle substances.

What I claim as new and desire to secure by Letters Patent of the United States is:

1. A composition of matter comprising an organo polysiloxane in which the organic groups are all attached to the silicon atoms of the polysiloxane by carbon-silicon linkages and the organic groups consist of thienyl radicals and a monovalent hydrocarbon radical selected from the class consisting of methyl and phenyl radicals.

2. A composition of matter comprising an organopolysiloxane in which all the organic groups are attached to the silicon atoms of the polysiloxane by carbon-silicon linkages and the organic groups consist of thienyl and methyl radicals.

3. A composition of matter comprising an organopolysiloxane in which all the organic groups are attached to the silicon atoms of the polysiloxane by carbon-silicon linkages and the organic groups consist of thienyl and phenyl radicals.

4. A composition of matter comprising an organopolysiloxane in which all the organic groups are attached to the silicon atoms of the polysiloxane by carbon-silicon linkages and consist of methyl and thienyl groups, the said organopolysiloxane being obtained by hydrolyzing a mixture of ingredients comprising from 0 to 50 mol percent methyl-trichlorosilane, from 30 to 50 mol percent dimethyldichlorosilane, and from 20 to 50 mol percent 2-thienyltrichlorosilane.

PHILIP A. DI GIORGIO.

References Cited in the file of this patent

UNITED STATES PATENTS

| Number | Name | Date |
|---|---|---|
| 2,238,669 | Wiley | Apr. 15, 1941 |
| 2,486,162 | Hyde | Oct. 25, 1949 |

OTHER REFERENCES

Krause et al.: Berichte Deut. Chem. Gesel., vol. 62, 1929, pp. 1710 to 1712.

Steinkopf: Die Chemie des Thiophens, 1941, pp. 124 and 125.

Gilman: Journ. Amer. Chem. Soc., March 1949, p. 1117.

Rochow: An Introduction to the Chemistry of the Silicones, Wiley, 1946, pp. 93 to 95.